United States Patent [19]

Antelman

[11] Patent Number: 5,073,382

[45] Date of Patent: Dec. 17, 1991

[54] DIVALENT SILVER ALKALINE BACTERICIDE COMPOSITIONS

[75] Inventor: Marvin S. Antelman, Rehovot, Israel

[73] Assignee: N. Jonas & Co., Inc., Bensalem, Pa.

[21] Appl. No.: 697,791

[22] Filed: May 9, 1991

[51] Int. Cl.⁵ ................................................ C02F 1/50
[52] U.S. Cl. ..................................... 424/604; 424/601; 424/602; 424/618; 514/495; 422/19; 422/28; 210/764; 210/169
[58] Field of Search .................. 210/764, 169; 422/19, 422/28; 424/618, 601, 602, 604; 514/495; 423/42

[56] References Cited

U.S. PATENT DOCUMENTS

| | | | |
|---|---|---|---|
| 4,055,655 | 10/1977 | Maurer et al. | 514/495 |
| 4,092,245 | 5/1978 | Franks et al. | 424/618 |
| 5,017,295 | 5/1991 | Antelman | 210/764 |

Primary Examiner—Stanley S. Silverman
Assistant Examiner—Neil M. McCarthy
Attorney, Agent, or Firm—Salter & Michaelson

[57] ABSTRACT

Solid alkaline bactericidal compositions are disclosed suitable for compounding alkaline end products such as food and dairy cleaners and surgical scrubbing soaps, formed by the neutralization of acid stabilized inorganic divalent silver complexes and capable of effecting 100% kills upon cultures of anaerobic bacteria colonies of 100K/cc. within 5 minutes.

1 Claim, No Drawings

DIVALENT SILVER ALKALINE BACTERICIDE COMPOSITIONS

BACKGROUND OF THE INVENTION

The present invention relates to the preparation of alkaline divalent silver (Ag(II)) bactericidal compositions. Said compositions are useful for a variety of applications ranging from water treatment to compounding surgical soaps. More particularly, this invention is concerned with changing bactericidally active Ag(II) complexes in acid solutions to stable alkaline compositions without destroying Ag(II) ion capabilities of the resulting composition, for it is well known that Ag(II) ions are favored in acid solutions in contradistinction to alkaline solutions. Said Ag(II) acid complexes comprise the subject matter of the inventor's U.S. Pat. No. 5,017,295 entitled Divalent Silver Bactericides for Water Treatment. Said bactericides failed to act in their sanitizing capacity when subjected to elevated pH. Furthermore, there was a need to be able to apply these compositions to a variety of conditions where an alkaline pH is essential, such as the aforementioned surgical soaps, disinfectant laundry detergents, dairy and food processing plant cleaners, etc. It was found that a special form of material called puffed borax was capable of converting said Ag(II) complexes into viable alkaline bactericides.

OBJECT OF THE INVENTION

The object of this invention is to provide an alkaline divalent silver bactericidal composition which will be compatible with alkaline formulations and still retain its sanitizing capabilities.

SUMMARY OF THE INVENTION

Ag(II) alkaline bactericidal compositions were prepared by mixing various ratios of Ag(II) complex acid liquid bactericidal compositions with puffed borax, said borax being a special low-bulk density, high-surface grade of tetrasodium borate manufactured by the McGean Corporation. The compositions, which varied in alkalinity, depending on the material ratios, were evaluated to see whether they exhibited bactericidal action. The bactericidal efficacy of the compositions was evaluated on E. Coli bacteria following a demanding protocol of the EPA, AOAC 15th 1990:965:13. Although it is possible that certain compositions may have qualified ordinarily as bactericides, our criteria demanded that only those compositions capable of killing 100K/cc cultures completely, i.e., 100% kills within 5 minutes, be considered effective for our purposes, because my intention was to be able to formulate a favorable composition into products such as surgical scrubbing soaps, where instant sanitizing effects are demanded of the resulting product.

The compositions were evaluated in the presence of 10 PPM of potassium monopersulfate as supplied by the duPont Company under its registered trademark Oxone, which tested nonbactericidal in the protocol, but which aids in the stabilization of the divalent state of silver. Evaluations were conducted over the alkaline pH range of 9-11. Potassium or sodium hydroxide was used for pH adjustments, although the end products desired are intrinsically higher than a pH of 9.

Other objects and features of the present invention will become apparent to those skilled in the art when the present invention is considered in view of the accompanying example.

DESCRIPTION OF THE PREFERRED EMBODIMENT

The following example is given to illustrate the preferred embodiment of my invention:

A solution of Ag(II) phosphate complex was prepared according to the following procedure. 1.7 grams of silver nitrate were added to a preheated solution of a mixture of 2.4 grams each of sodium hydroxide and potassium peroxydisulfate dissolved in 50 cc. of distilled water. The preheated solution was maintained at 85 degrees C. After the addition of the nitrate, the temperature rose and was maintained at 90 degrees C. for 15 minutes. The solution was then allowed to cool to 50 degrees C. Eighteen cc. of 85% phosphoric acid were then added to the solution. The temperature rose because of the exothermic reaction to 65 degrees C. After the resulting solution had cooled, distilled water was added to give a total final volume of 75 cc.

One cubic centimeter of the resulting Ag(II) solution was intimately mixed with 6.5 grams of puffed borax. There was heat released as this mixture was compounded. The resulting product was a hard mass which had a tan appearance. The resulting mass was crushed in an agate mortar into a fine powder of about 200 mesh. A solution containing 300 PPM of the resulting product was prepared in distilled water. The silver concentration of this solution was 5.5 PPM. This powder was evaluated as a bactericide according to the aforementioned EPA protocol. One hundred percent kills of E. Coli were obtained after 5 minutes, in the presence of 10 PPM of Oxone. This compares with 98% kills after 5 minutes and 100% kills after 10 minutes of a solution of the acid Ag(II) phosphate complex containing 2.0 PPM of silver.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by these claims.

What is claimed is:

1. A bactericidal solid which when dissolved in water yields an alkaline solution capable of killing anaerobic colonies of bacteria, comprising an acid stabilized solution of an inorganic complex of divalent silver which has been neutralized by at least 40% of the total weight of the composition with puffed borax.

* * * * *